Nov. 18, 1930.   E. W. DAVIS   1,781,948
LUBRICATING SYSTEM
Filed July 16, 1925
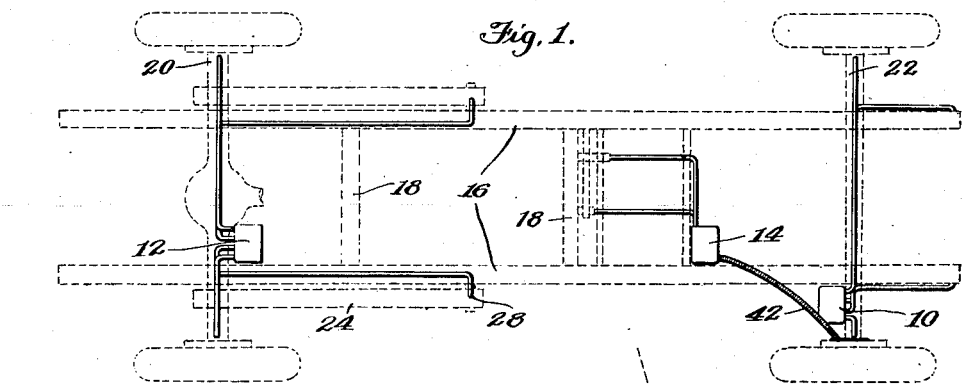
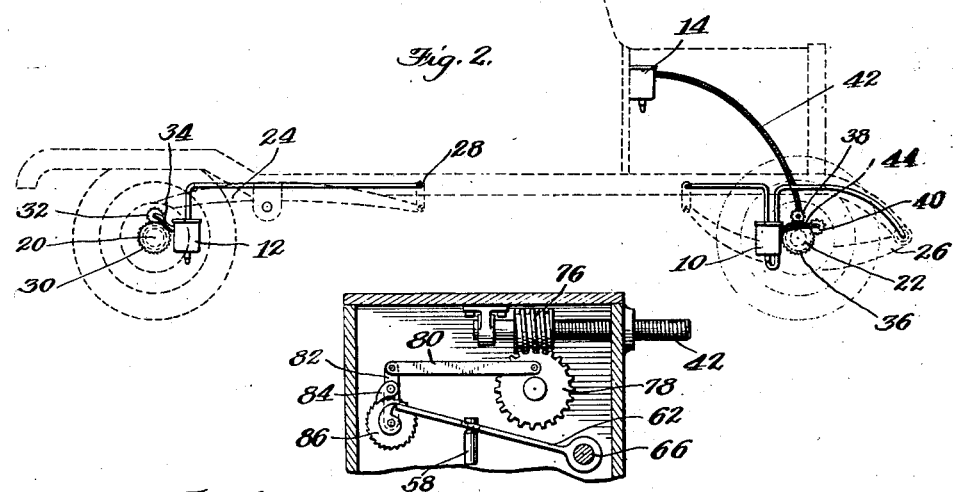
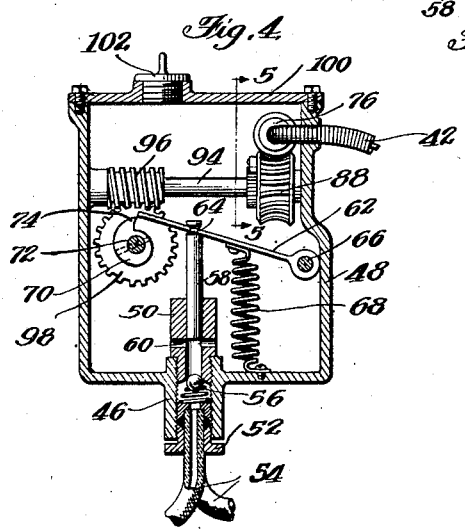
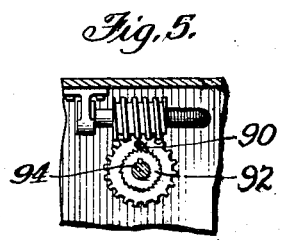
Inventor
Ernest W. Davis
By Pierce and Sweet
attys.

Patented Nov. 18, 1930

1,781,948

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed July 16, 1925. Serial No. 43,993.

My invention relates to improvements in lubricating systems, and more particularly to a novel type of lubricating system for lubricating the chassis bearings of automotive vehicles.

At the present time, several different types of systems are in use, among which is the so-called centralized type. In some systems of this type, a single pump supplies lubricant to all the chassis bearings through individual conduits, with means either in the pump or at the ends of the conduits for determining the amount of lubricant fed to each bearing upon each operation.

In another system of this type, a single conduit passes by a plurality of bearings, and branches lead from the single conduit to each individual bearing. In this case it is imperative to locate the apportioning means adjacent each bearing.

The system employing individual conduits is objectionable on account of the length of the conduits and the difficulty and expense of installing them and keeping them in condition, and the branched conduit system has been found more or less unreliable.

The objects of the present invention are:

First, to eliminate the excessive amount of conduit involved in the individual conduit system, and at the same time avoid the inaccuracies of the branched conduit system. I accomplish this primarily by subdividing the pumping means into several units, each supplying a plurality of bearings in the same portion of the chassis, so that the conduits are much shortened, without making the number of the pumping units excessive.

Second, to provide lubricant for the rear axle as a function of its individual rotation.

Third, to lubricate the front axle and body as a function of the distance traveled by the car.

Fourth, to lubricate the car when driving in either direction.

Further objects and advantages of the invention will become apparent as the description proceeds.

In the accompanying drawings:

Figure 1 is a more or less diagrammatic plan view of a system according to the invention.

Figure 2 is a side elevation of the showing of Figure 1.

Figure 3 is a fragmentary section showing one form of drive for a pumping unit.

Figure 4 is a similar section showing a modified form of drive.

Figure 5 is a detail section on line 5—5 of Figure 4.

In the embodiment of the invention selected for illustration, the pumping means for supplying oil is subdivided into a front axle unit 10, a rear axle unit 12 and a body unit 14. These have been illustrated as applied to a conventionalized showing of a motor vehicle comprising a frame made up of side members 16 united by a plurality of cross braces 18, and supported on the rear axle 20 and front axle 22 by the rear springs 24 and front springs 26.

The bearings to be lubricated are then subdivided into three groups, each group containing those that can most conveniently be lubricated from one of the units. In making such a selection both proximity and relative movement between the parts should be taken into consideration. Thus it is found more convenient to lubricate the bearings 28 for the fixed ends of the shackles at the forward ends of the rear springs 24 from unit 12 than from unit 14.

I have illustrated a conventionalized driving connection similar to that employed for driving speedometers comprising a gear 30 rotating with one of the rear wheels, a pinion 32 driven thereby, and a flexible shaft 34 for actuating suitable pumping mechanism in unit 12. Similar connections for the units 10 and 14 include a similar gear 36 on the front axle, two pinions 38 and 40 driven thereby, a flexible shaft 42 from the pinion 38 to the unit 14 and a flexible shaft 44 from the pinion 40 to the unit 10.

It will be observed that the actuation of the unit 12 is individually proportioned to the rotation of the rear axle. Thus, when the rear wheels are skidded in a mud hole and the rear axle transmission alone subjected to very severe use, a correspondingly generous lubrication will be provided for these parts only. On the other hand, the front axle, and the body bearings, which ordinarily receive use much more closely in proportion to the travel of the vehicle, are also lubricated in proportion to such use.

A suitable pump and transmission is indicated in Figures 3, 4 and 5. The pump itself may be of any suitable preferred form, such, for instance, as that shown and described in my Letters Patent No. 1,591,159, dated July 6, 1926. It comprises, briefly, a plurality of exit bosses 46 in the bottom of the casing 48, each exit boss receiving a cylinder body 50 and a gland 52 for connection to the end of one of the flexible conduits 54 leading to the various bearings. Between the body 50 and the gland 52 I provide a spring pressed check valve 56. Each body 50 has a vertical bore receiving the plunger 58, and a horizontal bore 60 forming a double inlet for the cylinder. A rocker plate 62 is provided with a plurality of apertures loosely receiving the reduced portions 64 of the plungers 58. The plate is pivoted on a shaft 66 and normally pulled down by a tension spring 68. A pair of cams 70 on a transverse shaft 72 support the corners of the plate 62. It will be apparent that slow rotation of the shaft 72 will periodically carry the toes 74 of the cams out from under the plate, and permit the spring 68 to snap the plungers down and deliver a charge of lubricant.

For rotating the shaft 72, I have shown in Figure 3, a worm 76 driven by the flexible shaft 34, 42 or 44 as the case may be. The worm 76 drives a wheel 78 actuating a link 80 eccentrically pivoted thereto. The other end of the link 80 reciprocates a rocker arm 82 carrying a spring pressed pawl 84 making a ratchet 86 on the shaft 72. It will be apparent that, regardless of whether the vehicle is moving forward or backward, the rotation of the worm wheel 78 will intermittently rotate the shaft 72 always in the same direction, and periodically operate the pumping mechanism.

In the embodiment illustrated in Figure 4 I employ a wheel 88 driven by the worm 76, and a one-way connection including a pawl 90 and ratchet 92 for driving the shaft 94. A worm 96 on the shaft 94 rotates the final worm wheel 98 on the shaft 72. In this embodiment, lubrication will occur whenever the vehicle is moving forward, but upon rearward movement the pawl 90 will ride over the ratchet 92 and no movement of the pump parts proper will occur.

The casing 48 is provided with a cover 100 having a filling aperture and plug 102 and functions both as a housing for the mechanism and as a reservoir for the lubricant.

Without further elaboration, the foregoing will so fully explain the gist of my invention, that others may, by applying current knowledge, readily adapt the same for use under various conditions of service. It will, for instance, be obvious that where either the load imposed on the manual actuating means, or the frequency of lubricating, is too great with a direct drive, as indicated in Figure 4, reduction gearing may readily be interpolated between the ratchet 86 and the shaft carrying the cams 70, to reduce to any desired degree both the load on the actuating means and the frequency of lubrication. This and many other modifications and adaptations may readily be made by those skilled in the art, without eliminating certain features which may properly be said to constitute the essential items of novelty involved, which items are intended to be defined and secured to me by the following claims.

I claim:

1. The combination with an automotive vehicle chassis comprising a frame and an axle movable with respect thereto, of a lubricating device mounted on said axle comprising resilient means for storing energy, a transmission for tensioning said resilient means and then suddenly releasing it, lubricant ejecting means actuated by the resilient means, said axle carrying rotatable parts, and a driving connection between said parts and said transmission, said driving connection including a pawl and ratchet for permitting reverse movement of the vehicle with the actuation of said transmission.

2. The combination with an automotive vehicle chassis comprising a frame and an axle movable with respect thereto, of a lubricating device mounted on said axle comprising a resilient means for storing energy, a transmission for tensioning said resilient means and then suddenly releasing it, lubricant ejecting means actuated by the resilient means, said axle carrying rotatable parts, and a driving connection between said parts and said transmission, said driving connection actuating said transmission in the same direction upon movement of the vehicle in either direction.

3. The combination with an automotive vehicle chassis comprising a frame and an axle movable with respect thereto, of a lubricating device mounted on said axle, said axle having rotatable parts and bearings for said parts, connections between said device and said bearings, and power connections between said rotatable parts and said device for actuating said device, said power connections including a drive element and a driven element, and a transmission for moving said driven element in the same direction irrespective of the direction of movement of said drive element.

In witness whereof, I hereunto subscribe my name this 11th day of July, 1925.

ERNEST W. DAVIS.